United States Patent

[11] 3,631,993

| [72] | Inventor | Robert R. Young<br>Danville, Calif. |
|---|---|---|
| [21] | Appl. No. | 803,837 |
| [22] | Filed | Mar. 3, 1969 |
| [45] | Patented | Jan. 4, 1972 |
| [73] | Assignee | Kaiser Industries Corporation<br>Oakland, Calif.<br>Original application July 25, 1966, Ser. No. 567,674, now abandoned. Divided and this application Mar. 3, 1969, Ser. No. 803,837 |

[54] CONTAINERIZED CARGO STORAGE AND HANDLING SYSTEM
1 Claim, 2 Drawing Figs.

[52] U.S. Cl. ................................. 214/16.4 A,
 214/14
[51] Int. Cl. ................................. B65g 1/06
[50] Field of Search ........................... 214/16 B,
 14, 16.4, 16.42

[56] References Cited
UNITED STATES PATENTS
1,927,677 9/1933 Bennington ........... 214/16.4 (2)
2,096,958 10/1937 Clerc ..................... 214/164 (2)
3,091,188 5/1963 Graham ................. 214/16 B X
FOREIGN PATENTS
446,825 5/1936 Great Britain ............ 214/16 B

*Primary Examiner*—Gerald M. Forlenza
*Assistant Examiner*—Raymond B. Johnson
*Attorneys*—James E. Toomey, Paul E. Calrow and Harold L. Jenkins ABSTRACT: A system for loading containers onto and unloading containers from a cargo carrier docked at a shipping terminal, including a storage facility at the dock in which containers to be loaded onto or that have been unloaded from a carrier are temporarily placed, a crane projecting over the carrier and the dock and being spaced from the storage facility, a closed path on the dock extending adjacent to the crane and to the storage facility, and conveyors movable on the path adapted to support containers and to transfer the same between the crane and the storage facility, said system providing for recording the identity of the containers in the storage facility and the carrier in order to facilitate retrieval and movement of the containers.

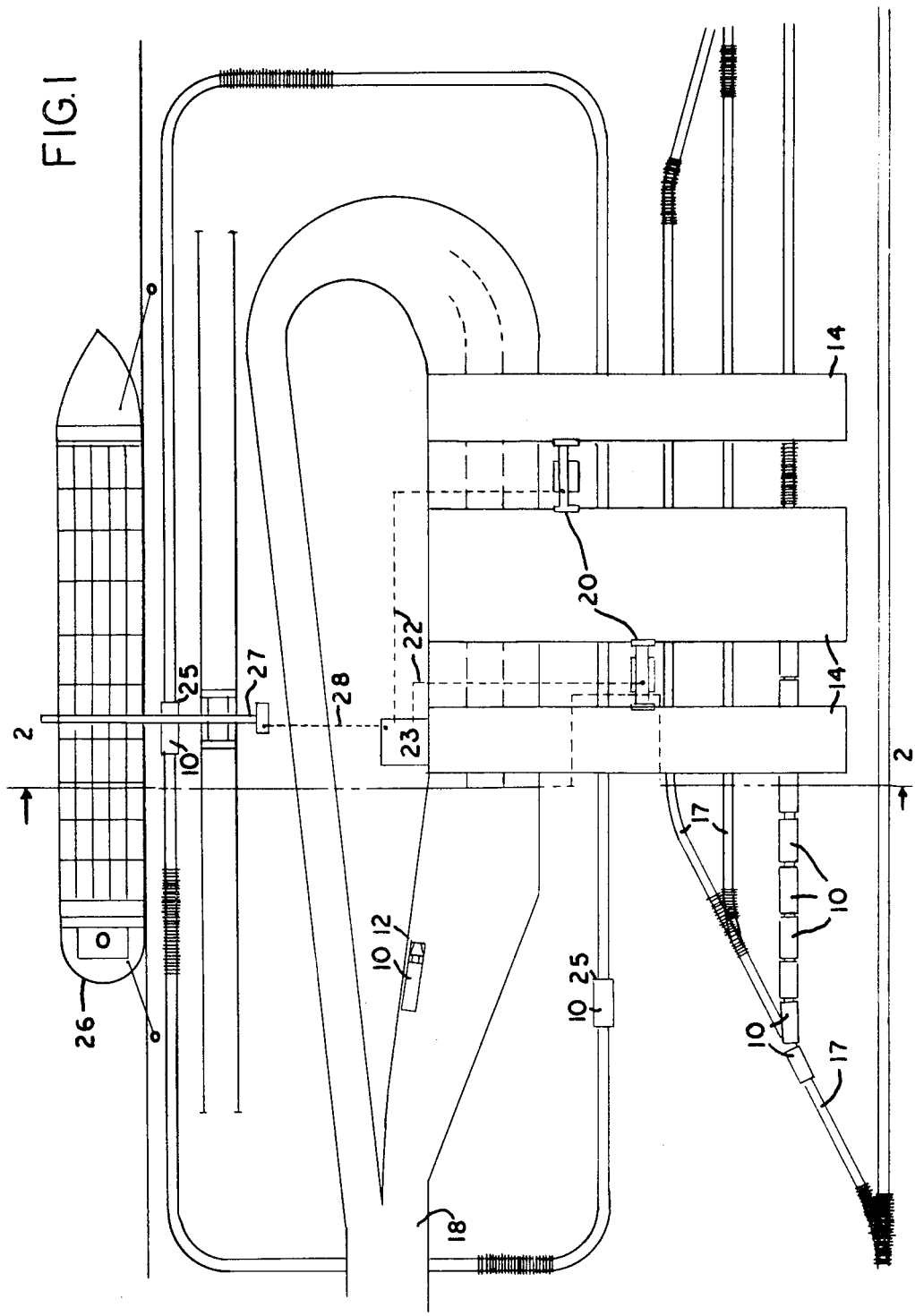

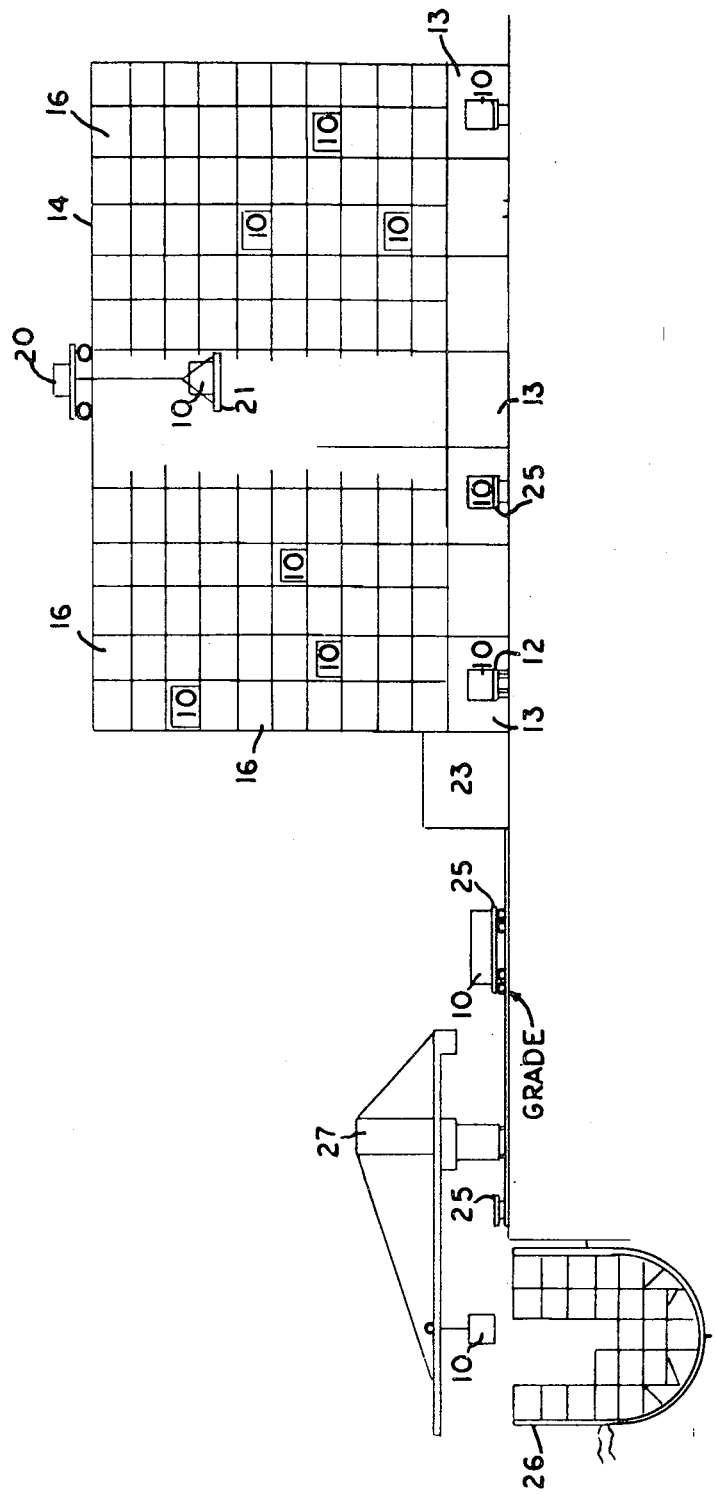

CONTAINERIZED CARGO STORAGE AND HANDLING SYSTEM

This application is a division of my prior copending application Ser. No. 567,674, filed July 25, 1966, now abandoned.

Containerized cargo systems are well known and are characterized by the use of large containers into which cargo is placed so that it may thereafter be handled by movement of the container rather than the cargo itself. The use of containers for handling cargo results in many advantages including the convenience of handling small or fungible goods in large units, the protection of cargo from pilferage, and the ease of handling cargo in containers of the same size and adapted in the same way for use with cranes, fork trucks, or other cargo moving devices.

The present invention pertains to a containerized cargo handling system for shipping terminals and more particularly to a method and apparatus for handling containers which provides for rapid and efficient movement of containers between a storage facility and a ship loading-unloading crane and for identifying containers in the system. This invention also includes storage facility to provide an interim resting place for cargo and preferably the storage facility is vertically arranged to be economical of space. The storage facility is integrated into the system by container conveyors which travel a closed path into and out of stations adjacent to the storage facility and to a crane for loading and unloading the cargo carrier.

In this description and the appended claims, the following terms are intended to have the meaning set forth below. The term "computer" is intended to mean an electronic device of known character capable of receiving electronic signals which convey information, capable of remembering the information so received, capable of retrieving from memory a specific item of information, and capable of sending an information-conveying signal to a device that is actuated by that signal to perform a function characteristic of that signal. These are minimum and general functions of the computer and are not intended as being inclusive as many other functions may be, and in fact are contemplated to be carried out by a computer in the system of this invention as will be developed more fully hereinafter.

The term "predetermined size" as employed to describe a cargo container is intended to mean a cargo container that is of a size and shape conforming to a limited selection of sizes and shapes that the cargo handling equipment of the system is adapted to move, load, unload, and fix to various means of transportation. The containers will usually be limited in length, width and depth to conform to legal limits for highway transportation, but smaller size containers will also ordinarily be employed. The containers, in addition to being of a limited selection of sizes and shapes, are preferably similarly adapted to be moved, as by being grasped from above and lifted from below. Containers may be enclosed on all six sides, they may have only a floor and sidewalls, or they may have merely a floor and be in the form of a pallet. The type of container used is adapted to the nature of the cargo being contained, but all containers are preferably similarly adapted to being moved, connected to transport means, being identified or otherwise used in the system.

The term "conveyor" as used herein indicates a means for moving cargo containers between points that are relatively close to one another. For example, the conveyor may move cargo from storage to a ship, a train, or a highway vehicle and the conveyor may be a belt, a series of rollers, electric cars running on rails or any equivalent device.

The term "transport means" is intended to mean devices for transporting cargo to remote points beyond the cargo handling facility, such as between different cities. Such devices as ships, railroad trains, highway vehicles, and aircraft are typical of the transportation means contemplated by this invention.

The system embodying the invention includes as apparatus elements a computer, cargo containers of predetermined dimensions which are preferably adapted to be uniquely identified by means capable of providing computer input, a regular array of storage compartments for cargo containers which is preferably a vertical alignment of storage compartments of a size and shape to accept the cargo containers, transport means for moving cargo containers between remote destinations, the transport means also being adapted to receive the cargo containers in a regular array when a large number of containers are carried by a single transport means. The system also includes devices for moving cargo containers between the other elements of the system such as conveyors for horizontal movement, and cargo moving, loading and unloading means for moving cargo into and out of storage compartments and onto and off of transport means. The various cargo moving means such as cranes and elevators, are constructed to send signals to the computer containing intelligence such sd the location of containers, and the identification of a container, and to receive signals from the computer which command the means to retrieve a specific container from its location. The computer and the various cargo moving means are also made so that the signals sent and received are useable interchangeably with similar elements in remote cargo handling facilities so that cargo loaded and identified at a point of origin can be unloaded, stored, or dispatched on appropriate transport means at its destination employing the same memory means to identify and locate the cargo and the same signals to actuate the equipment of handling cargo.

To facilitate the explanation of this invention a specific example of its operation will be described in conjunction with the accompanying drawings. SInce the example is for illustration only this invention is not intended to be limited by the drawings or the specific example described in conjunction therewith but only by the claims which define it in its more general sense.

FIG. 1 is a schematic plan view of a cargo handling system representing a system unit that may be duplicated with regard to functional elements at remote points.

FIG. 2 is a schematic sectional elevation view of the cargo handling unit illustrated in FIG. 1 taken along 2—2.

This particular embodiment of the invention will first be described with reference to containerized cargo being received into the system from railroad cars and highway vehicles and being dispatched on a ship to a remote destination. Cargo containers 10 are illustrated arriving both by train 11 and highway vehicle 12. The containers enter the system on transport means passing through passageways in the lower portion of a vertically disposed cargo storage element 14 consisting of a vertical array of cargo storage compartments 16 that are of a size and shape to receive the maximum size container that will be used. Suitable tracks 17 and pavement 18 are provided for the transport means employed. In FIG. 1 there is shown four vertical cargo storage elements, two of which are back to back between the other two. Each pair of cargo storage elements is served with a container moving device 20 which is capable of traversing from side to side of the storage elements and elevating cargo containers thereby to receive containers from transportation means and to place them in storage compartments 16.

The cargo moving device 20 is shown as a gantry crane traversing the cargo storage elements 14 on tracks located on the top of the elements and employing an elevator 21 to position the cargo container at the right elevation for storage or for being retrieved from storage. Known devices, not shown, adapt the compartments 16 and the elevator 21 for inserting and retracting containers from compartments The cargo moving device 20 contains a means for transmitting a signal via line 22 to a computer 23. The signal contains information as to the location of the container, and when appropriate, a signal representative of the container's unique identification or information as to the contents. The signal containing information as to location might be merely a confirmation that cargo moving device 20 has placed a specific container in a specific compartment according to a command from computer 23, and the confirmation may be in the form of an absence of a signal indicating that the compartment in which the container is to be placed is already occupied.

Each container may be adapted with unique identification, such as a magnetic plate, a punched card or other known means, which is read by means associated with the cargo moving device 20 and the identification may be transmitted to computer 23. Computer 23 as heretofore described, contains a memory in which the location of each container is stored. Computer 23 also is capable of retrieving from its memory the location of a container, transmitting a signal to container moving device 20 gibing the address of the container and commanding container moving device 20 to retrieve the container from its storage compartment and deposit it on a specific transport means or on a conveyor. For this purpose a conveyor 25 is shown passing through a passageway in the storage element 14 where it can either receive or deliver containers 10.

Cargo received by railroad or highway transport is stored in compartments 16 and held until it is ready to be dispatched as by ship 26. When ship 26 is to be loaded, identity of the cargo to be placed on board is fed into computer 23 and computer 23 searches its memory for the location of each item of cargo, transmits signals to cargo moving means 20 to retrieve those items of cargo from storage and to place them on conveyor 25 which in turn delivers them to a point adjacent vessel 26.

At this point loading-unloading device 27, shown here as a cantilever crane, loads containers 10 into the hold of vessel 26 which is shown in FIG. 2 to be specially adapted to receive containers 10. Loading-unloading device 27 senses the location of each container in ship 26 and the location of each is transmitted via line 28 as a signal identifying the location or address of the container in the hold of vessel 26 and that location or address is placed into memory by computer 23. Again, as in the case of the storage elements 14, the computer may select the location of each cargo container in the ship and command loading-unloading device 27 to place each container into its selected location, in which case the signal to the computer may be the absence of a signal that the selected location is already occupied, or a signal confirming that the command has been executed. When the vessel 26 is completely loaded, the location of each container and therefore its cargo is in a computer memory that is useful in a computer that is capable of retrieving the location of each container from memory, transmitting a signal representative of that location to a loading-unloading device, and giving a command to that loading-unloading device to retrieve any cargo container from its location in the vessel.

When the vessel is loaded, it is one embodiment of this invention to remove the computer memory from computer 23, and to send it with the cargo on vessel 26 so that the memory may be employed in a similar computer at the destination of vessel 26 for use in unloading. Of course a single computer can be used in many cargo handling facilities if the computer is connected, as by transcontinental telephone lines, between facilities remote from each other. In such cases, the memory need not accompany the cargo because a single computer can actuate cargo handling devices at a number of remote facilities.

The process of unloading and dispatching the cargo to its destination is generally the reverse of the loading process. When vessel 26 arrives at its destination a similar containerized cargo handling system is employed to unload the vessel. The computer memory arriving with the vessel is introduced into computer 23 and each container, and therefore its contents, is identified as it is unloaded form vessel 26, placed onto conveyor 25, and transported to a storage element 14. A cargo moving device 20 places each container into a storage compartment and the specific storage compartment in which that container is stored is introduced into the memory in computer 23 as set forth hereinbefore. The vessel 26 thus may be completely unloaded, and all or any number of cargo containers may be placed in storage until appropriate transportation means arrives to receive it. The cargo may also be loaded directly from conveyor 25 onto appropriate transportation means if an intermediate storage period is not necessary. However, most cargo must be put into storage to accommodate for the time gap between unloading the vessel 26 and loading of suitable land transportation. When appropriate transport means is available such as train 11 or highway transportation 12, the cargo to be carried on the transport means will be identified to the computer and the computer will search its memory to find the location of that cargo, dispatch a command to cargo moving device 20 to retrieve the cargo from its storage compartment 16 and to place it on the designated transport means.

As stated above, the systems represented in FIGS. 1 and 2 are intended to be illustrative representations and not limitations on the systems included in this invention. The computer 23 can perform many functions other than committing the location of containers to memory and issuing commands to cargo moving devices. For example, the computer may inventory cargo, print bills of lading and other documents of title that are used in the normal course of shipping and handling cargo, balance the load on ships, measure time limits for holding refrigerated or perishable cargo and many others. It is also contemplated that various associated devices may be used for such functions as identifying each cargo container, placing transport means in register so that associated equipment such as container loading unloading devices and container moving devices may be in appropriate position to receive and discharge cargo containers, adapting means for grasping or moving containers to the size and shape container being moved, and others.

Having thus described the invention, what is claimed is:

1. In a containerized cargo handling system for a dock area including a ship having an upwardly opening hold docked in said area; the combination of a storage housing at said dock area including at least a pair of vertical arrays of substantially horizontally extending compartments which face a common vertically extending passageway, containers of predetermined sizes in said compartments and hold, a crane projecting over the hold and over the surface of the dock area, a circuitous, endless track in the dock area lying adjacent to said crane and extending beneath the lowermost of said compartments and crossing said passageway, conveyor cars on the track movable therealong between a first station adjacent to the crane and a second station within said passageway, each car including means for supporting a container that is deposited thereon at one station and from which it is discharged at the other of said stations, said cars moving independently of each other along the track, said crane including means for transferring a container between one of said cars and the hold when such car is in said first station, separate movable means in said passageway for transferring a container between a compartment and one of said cars when such car is in the second station, and a roadway directing overland vehicles into loading and unloading positions within said passageway and beneath the lowermost of said compartments, said movable means in the passageway serving to transfer a container between a compartment and a vehicle in said loading and unloading position.

* * * * *